US010896096B2

(12) United States Patent
Chen et al.

(10) Patent No.: US 10,896,096 B2
(45) Date of Patent: *Jan. 19, 2021

(54) TEMPORAL LOGICAL TRANSACTIONS

(71) Applicant: International Business Machines Corporation, Armonk, NY (US)

(72) Inventors: Yao-Ching S. Chen, Saratogo, CA (US); Xiaohong Fu, Milpitas, CA (US); Fung Lee, San Jose, CA (US); Claire W. McFeely, San Jose, CA (US); Maryela E. Weihrauch, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 312 days.

This patent is subject to a terminal disclaimer.

(21) Appl. No.: 15/134,446

(22) Filed: Apr. 21, 2016

(65) Prior Publication Data

US 2017/0308563 A1 Oct. 26, 2017

(51) Int. Cl.
*G06F 11/14* (2006.01)
*G06F 16/23* (2019.01)
*G06F 16/2458* (2019.01)

(52) U.S. Cl.
CPC ...... *G06F 11/1446* (2013.01); *G06F 16/2336* (2019.01); *G06F 16/2365* (2019.01); *G06F 16/2477* (2019.01)

(58) Field of Classification Search
CPC .......... G06F 17/30353; G06F 11/1446; G06F 17/30289; G06F 17/30368;
(Continued)

(56) References Cited

U.S. PATENT DOCUMENTS 6,631,374 B1 10/2003 Klein et al.
8,301,934 B1 * 10/2012 Ramesh .................. G06F 16/35
714/18

(Continued)

FOREIGN PATENT DOCUMENTS

WO 2015144003 A1 10/2015
WO 2015144004 A2 10/2015

OTHER PUBLICATIONS

List of IBM Patents or Applications Treated as Related.
Saracco, Cynthia et al, "A matter of time: temporal data management in DB2 10", Technical Report, IBM; Apr. 2012.

*Primary Examiner* — Ashish Thomas
*Assistant Examiner* — Suman Rajaputra
(74) *Attorney, Agent, or Firm* — North Shore Patents, P.C.; Michele Liu Baillie

(57) ABSTRACT

In supporting temporal logical transactions, a database management system (DBMS) determines that a temporal logical transaction time (T) is set for a temporal logical transaction. The DBMS receives a change request for a current row in a current table. A history row for a history table corresponding to the current table is created. The values in the history row are set to the values in the current row, where a begin time in the history row has same value as a begin time in the current row, and an end time in the history row is set to T. When the begin time equals the end time in the history row, the DBMS does not store the history row in the history table. The values in the current row are changed according to the change request, and the begin time in the current row is set to T.

9 Claims, 7 Drawing Sheets

(58) Field of Classification Search
CPC ........... G06F 17/30371; G06F 16/2336; G06F 16/2477; G06F 16/2365
See application file for complete search history.

(56) References Cited

U.S. PATENT DOCUMENTS

| | | |
|---|---|---|
| 8,713,073 B2 | 4/2014 | Johnston et al. |
| 8,738,568 B2 | 5/2014 | Ghosh et al. |
| 8,959,048 B1 | 2/2015 | Rossberg et al. |
| 8,972,459 B2 | 3/2015 | Chaliparambil et al. |
| 2007/0130226 A1* | 6/2007 | Banerjee ............... G06F 16/217 |
| 2013/0018849 A1* | 1/2013 | Johnston ............... G06F 16/219 |
| | | 707/687 |
| 2015/0278281 A1 | 10/2015 | Zhang |
| 2016/0283530 A1* | 9/2016 | Diehl .................. G06F 16/2474 |

* cited by examiner

INITIAL DATA

Statement:

401— INSERT INTO policy VALUES ('C882', 'PPO', 10);

POLICY table data:

| p_id | type | copay | sys_start | sys_end | trans_id |
|---|---|---|---|---|---|
| C882 | PPO | 10 | 2013-11-25-11.15.00 | 9999-12-30-11.00.00 | 2013-11-25-11.15.00 |

402—

POLICY_HIST table data: (empty)

| p_id | type | copay | sys_start | sys_end | trans_id |
|---|---|---|---|---|---|
|  |  |  |  |  |  |

FIG. 4A

CASE ONE – Single Temporal Logical Transaction with Multiple Physical Transactions

Start of temporal logical transaction scope (LT):

404
```
SET TEMPORAL_LOGICAL_TRANSACTION_TIME = CURRENT TIMESTAMP; -- assume '2013-12-02-08.17.33'
...
COMMIT;
```

Actual date (at start of physical transaction) (PT1): 2013-12-02-08.20.45

405
```
UPDATE policy SET type = 'HMO' WHERE p_id = 'C882';
.....
COMMIT;
```

Actual date (at start of transaction)(PT2): 2013-12-02-08.25.48

406
```
UPDATE policy SET copay = 5 WHERE p_id = 'C882';
.....
COMMIT;
```

POLICY table data:

| p_id | type | copay | sys_start | sys_end | trans_id |
|---|---|---|---|---|---|
| C882 | HMO | 10 | 2013-12-02-08.17.33 | 9999-12-30-00.00.00 | 2013-12-02-08.20.45 |
| C882 | HMO | 5 | 2013-12-02-08.17.33 | 9999-12-30-00.00.00 | 2013-12-02-08.25.48 |

407—
408—

POLICY_HIST table data:

| p_id | type | copay | sys_start | sys_end | trans_id |
|---|---|---|---|---|---|
| C882 | PPO | 10 | 2013-11-25-11.15.00 | 2013-12-02-08.17.33 | 2013-11-25-11.15.00 |
| C882 | HMO | 10 | 2013-12-02-08.17.33 | 2013-12-02-08.17.33 | 2013-12-02-08.20.45 |

CASE TWO – Multiple Temporal Logical Transactions within Single Physical Transaction

Actual date (at start of physical transaction)(PT): 2013-12-02-08.15.45

```
COMMIT;
```

Temporal logical transaction 1 (LT1)

421 — SET TEMPORAL_LOGICAL_TRANSACTION_TIME = CURRENT TIMESTAMP; -- assume '2013-12-02-08.17.33'
422 — UPDATE policy SET type = 'HMO' WHERE p_id = 'C882';

Temporal logical transaction 2 (LT2)

423 — SET TEMPORAL_LOGICAL_TRANSACTION_TIME = CURRENT TIMESTAMP; -- assume '2013-12-02-08.20.10'
424 — UPDATE policy SET copay = 5 WHERE p_id = 'C882';
COMMIT;

POLICY table data:

| | p_id | type | copay | sys_start | sys_end | trans_id |
|---|---|---|---|---|---|---|
| 425 → | C882 | HMO | 10 | 2013-12-02-08.17.33 | 9999-12-30-00.00.00 | 2013-12-02-08.15.45 |
| 426 → | C882 | HMO | 5 | 2013-12-02-08.20.10 | 9999-12-30-00.00.00 | 2013-12-02-08.15.45 |

POLICY_HIST table data:

| | p_id | type | copay | sys_start | sys_end | trans_id |
|---|---|---|---|---|---|---|
| 427 → | C882 | PPO | 10 | 2013-11-25-11.15.00 | 2013-12-02-08.17.33 | 2013-11-25-11.15.00 |
| 428 → | C882 | HMO | 10 | 2013-12-02-08.17.33 | 2013-12-02-08.20.10 | 2013-12-02-08.15.45 |

FIG. 4C

CASE THREE – Multiple Temporal Logical Transactions within Single Physical Transaction with conflict

Actual date (at start of physical transaction)(PT): 2013-12-02-08.15.45

```
COMMIT;
```

Temporal logical transaction 1 (LT1)

431 — SET TEMPORAL_LOGICAL_TRANSACTION_TIME = CURRENT TIMESTAMP; -- assume '2013-12-02-08.17.33'
432 — UPDATE policy SET type = 'HMO' WHERE p_id = 'C882';

Temporal logical transaction 2 (LT2)

433 — SET TEMPORAL_LOGICAL_TRANSACTION_TIME = '2013-12-02-00.00.00'
434 — UPDATE policy SET copay = 5 WHERE p_id = 'C882';
COMMIT;

POLICY table data:

| | p_id | type | copay | sys_start | sys_end | trans_id |
|---|---|---|---|---|---|---|
| 435 → | C882 | HMO | 10 | 2013-12-02-08.17.33 | 9999-12-30-00.00.00 | 2013-12-02-08.15.45 |

POLICY_HIST table data:

| | p_id | type | copay | sys_start | sys_end | trans_id |
|---|---|---|---|---|---|---|
| 436 → | C882 | PPO | 10 | 2013-11-25-11.15.00 | 2013-12-02-08.17.33 | 2013-11-25-11.15.00 |
| 437 → | *C882* | *HMO* | *10* | *2013-12-02-08.17.33* | *2013-12-02-00.00.00* | *2013-12-02-08.15.45* |

FIG. 4D

CASE FOUR – Concurrent Applications and Multiple Concurrent Temporal Logical Transactions

App1: Actual date (at start of physical transaction containing following temporal logical transaction (PT1): 2013-12-02-08.15.45

App2: Actual date (at start of physical transaction containing following temporal logical transaction (PT2): 2013-12-02-08.17.55

Temporal Logical Transaction 1 (LT1):

441 — SET TEMPORAL_LOGICAL_TRANSACTION_TIME = CURRENT TIMESTAMP; -- assume '2013-12-02-08.17.33'

442 — UPDATE policy SET type = 'HMO' WHERE p_id = 'C882';

Temporal Logical Transaction 2 (LT2):

443 — SET TEMPORAL_LOGICAL_TRANSACTION_TIME = '2013-12-02-08.20.10'

444 — UPDATE policy SET type = 'POS' WHERE p_id = 'C882';

POLICY table data:

| p_id | type | copay | sys_start | sys_end | trans_id |
|---|---|---|---|---|---|
| 445 — C882 | HMO | 10 | 2013-12-02-08.17.33 | 9999-12-30-00.00.00 | 2013-12-02-08.15.45 |
| 446 — C882 | POS | 10 | 2013-12-02-08.20.10 | 9999-12-30-00.00.00 | 2013-12-02-08.17.55 |

POLICY_HIST table data:

| p_id | type | copay | sys_start | sys_end | trans_id |
|---|---|---|---|---|---|
| 447 — C882 | PPO | 10 | 2013-11-25-11.15.00 | 2013-12-02-08.17.33 | 2013-11-25-11.15.00 |
| 448 — C882 | HMO | 10 | 2013-12-02-08.17.33 | 2013-12-02.-8.20.10 | 2013-12-02-08.15.45 |

FIG. 4E

CASE FIVE – Concurrent Applications and Multiple Concurrent Temporal Logical Transactions, with conflict

App1: Actual date (at start of physical transaction (PT1) containing following temporal logical transaction): 2013-12-02-08.15.45

App2: Actual date (at start of physical transaction (PT2) containing following temporal logical transaction): 2013-12-02-08.17.33

Temporal Logical Transaction 1 (LT1):

451 — SET TEMPORAL_LOGICAL_TRANSACTION_TIME = CURRENT TIMESTAMP; -- assume '2013-12-02-08.17.33'

452 — UPDATE policy SET type = 'HMO' WHERE p_id = 'C882';

Temporal Logical Transaction 2 (LT2):

453 — SET TEMPORAL_LOGICAL_TRANSACTION_TIME = '2013-12-02-00.00.00'

454 — UPDATE policy SET type = 'POS' WHERE p_id = 'C882';

POLICY table data:

| p_id | type | copay | sys_start | sys_end | trans_id |
|---|---|---|---|---|---|
| 455 — C882 | HMO | 10 | 2013-12-02-08.17.33 | 9999-12-30-00.00.00 | 2013-12-02-08.15.45 |

POLICY_HIST table data:

| p_id | type | copay | sys_start | sys_end | trans_id |
|---|---|---|---|---|---|
| 456 — C882 | PPO | 10 | 2013-11-25-11.15.00 | 2013-12-02-08.17.33 | 2013-11-25-11.15.00 |
| 457 — C882 | HMO | 10 | 2013-12-02-08.17.33 | 2013-12-02-00.00.00 | 2013-12-02-08.15.45 |

FIG. 4F

CASE SIX – Concurrent Applications with Temporal Logical Transaction Concurrent with Physical Transaction, with conflict

App1: Actual date (at start of physical transaction (PT1) containing following temporal logical transaction): 2013-12-02-08.15.45

App2: Actual date (at start of physical transaction (PT2) containing following statement): 2013-12-02-08.16.33

Temporal Logical Transaction 1 (LT):

461 — SET TEMPORAL_LOGICAL_TRANSACTION_TIME = CURRENT TIMESTAMP; -- assume '2013-12-02-08.17.33'

462 — UPDATE policy SET type = 'HMO' WHERE p_id = 'C882';

463 — UPDATE policy SET type = 'POS' WHERE p_id = 'C882';

POLICY table data:

| p_id | type | copay | sys_start | sys_end | trans_id |
|---|---|---|---|---|---|
| C882 | HMO | 10 | 2013-12-02-08.17.33 | 9999-12-30-00.00.00 | 2013-12-02-08.15.45 |

464

POLICY_HIST table data:

| p_id | type | copay | sys_start | sys_end | trans_id |
|---|---|---|---|---|---|
| C882 | PPO | 10 | 2013-11-25-11.15.00 | 2013-12-02-08.17.33 | 2013-11-25-11.15.00 |
| C882 | HMO | 10 | 2013-12-02-08.17.33 | 2013-12-02-08.16.33 | 2013-12-02-08.15.45 |

CASE SEVEN – Concurrent Applications with Temporal Logical Transaction Concurrent with Physical Transaction, with conflict

App1: Actual date (at start of physical transaction (PT1) containing following temporal logical transaction): 2013-12-02-08.15.45

App2: Actual date (at start of physical transaction (PT2) containing following statement): 2013-12-02-08.15.33

Temporal Logical Transaction 1 (LT):

471 — SET TEMPORAL_LOGICAL_TRANSACTION_TIME = CURRENT TIMESTAMP; -- assume '2013-12-02-08.00.00'

472 — UPDATE policy SET type = 'HMO' WHERE p_id = 'C882';

473 — UPDATE policy SET type = 'POS' WHERE p_id = 'C882';

POLICY table data:

| p_id | type | copay | sys_start | sys_end | trans_id |
|---|---|---|---|---|---|
| C882 | POS | 10 | 2013-12-02-08.15.33 | 9999-12-30-00.00.00 | 2013-12-02-08.15.33 |

474

POLICY_HIST table data:

| p_id | type | copay | sys_start | sys_end | trans_id |
|---|---|---|---|---|---|
| C882 | PPO | 10 | 2013-11-25-11.15.00 | 2013-12-02-08.15.33 | 2013-11-25-11.15.00 |
| C882 | POS | 10 | 2013-12-02-08.15.33 | 2013-12-02-08.00.00 | 2013-12-02-08.15.45 |

TEMPORAL LOGICAL TRANSACTIONS

BACKGROUND

Some database systems support temporal data management, which allows companies to track and query historical, current, and future conditions in an efficient and cost-effective manner. This provides a way to implement auditing and compliance initiatives, to pinpoint and correct human errors, to ensure the integrity of data over time, and to assess changing business conditions.

Temporal data management may allow operations to insert, update, delete, and query data in the past, the present, and the future while maintaining a history of data changes. This is based on system timestamps assigned internally by the database system to manage system time, also known as transaction time or physical transaction time. System time is used to track when changes are made to the state of a system-period temporal table and to define a time period of when the values in a row is considered current. These values implement system-period data versioning that specifies that old rows are archived into a corresponding history table. When a system-period temporal table is created, a history table is also created with identical structure. Rows are inserted into the history table as data changes are made to its corresponding system-period temporal table.

A physical transaction groups multiple structured query language (SQL) statements as one unit of work so that they are either all committed (i.e. applied to the database) or all rolled back (i.e. undone from the database) together. When multiple changes are made to a row of a system-period temporal table within the same physical transaction scope, the intermediate changes are not reflected in its corresponding history table. The history data rows stored in one physical checkpoint interval (unit of work) appear as if they were produced by one single business function. However, statements in a physical transaction may not actually be produced by a single business function. In this situation, the history data rows in the history table may not capture changes useful from a business function point of view.

SUMMARY

Disclosed herein is a method for temporal logical transaction support for temporal data management by a database management system and a corresponding database system and a computer program product as specified in the independent claims. Embodiments of the present invention are given in the dependent claims. Embodiments of the present invention can be freely combined with each other if they are not mutually exclusive.

According to an embodiment of the present invention, in a method for temporal logical transaction support for temporal data management, a database management system determines that a temporal logical transaction time (T) is set for a temporal logical transaction. The database management system receives a change request for a current row in a current table, where the change being a part of a physical transaction and the temporal logical transaction. A history row for a history table corresponding to the current table is created. The values in the history row are set to the values in the current row, where a begin time in the history row has the same value as a begin time in the current row, and an end time in the history row is set to T. Upon determining that the begin time in the history row is equal to the end time in the history row, the database management system does not store the history row in the history table, without considering any commits in the physical transaction. The values in the current row are changed according to the change request, and the begin time in the current row is set to T.

In one aspect of the present invention, upon determining that the begin time in the history row is greater than the end time in the history row, the history row is not stored in the history table, and the change request is failed, where the values in the current row are not changed according to the change request.

In one aspect of the present invention, upon determining that the begin time in the history row is equal to the end time in the history row, not storing the history row in the history table, and upon determining that the begin time in the history row is not equal to the end time in the history row, storing the history row in the history table.

BRIEF DESCRIPTION OF THE DRAWINGS

FIGS. 4A-4H illustrate examples of the method for temporal logical transaction support according to embodiments of the present invention.

DETAILED DESCRIPTION

Figure 1:
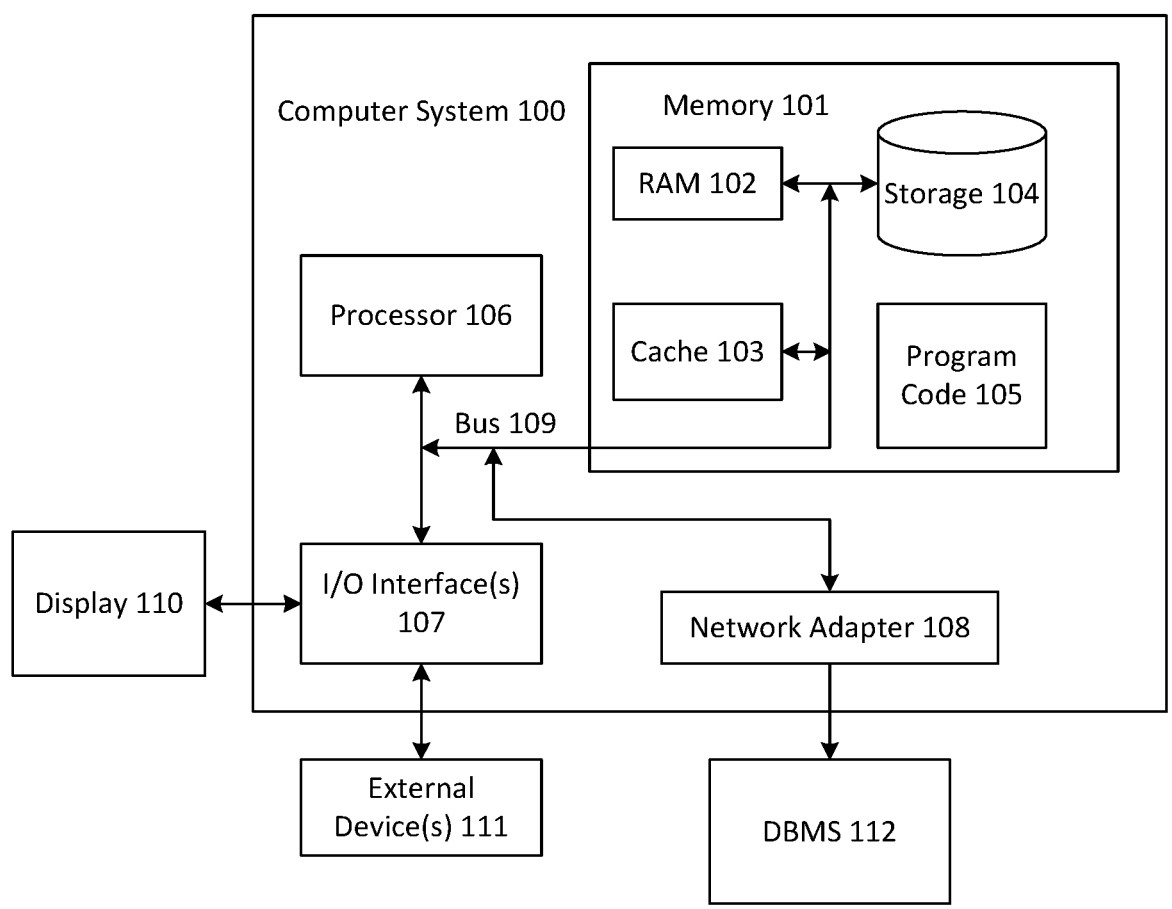
FIG. 1 illustrates a system with temporal logical transactions according to embodiments of the present invention.

Embodiments of the present invention provide temporal logical transactions in a database system, as described below. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a system with temporal logical transactions according to embodiments of the present invention. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more database management systems (DBMS) 112 via network adapter 108.

Embodiments of the present invention provide temporal logical transactions in a database system to allow an application or business function to manage logical units of temporal work for system-period temporal tables. The scope of a temporal logical transaction is a period of time for which historical rows are stored in the history table, reflecting changes to its corresponding system-period temporal table from before the logical unit of work as compared to the state of the table at the end of the logical unit of work. Embodiments of the present invention address scenarios where a single physical transaction contains multiple temporal logical transactions, where a single temporal logical transaction contains multiple physical transactions, and/or where multiple temporal logical transactions interact with multiple physical transactions. When multiple changes are made to a row of a system-period temporal table within the same logical unit of temporal work (referred to herein as a "temporal logical transaction"), the intermediate changes are not reflected in the history table.

For the embodiments of the present invention illustrated herein, the system-period temporal table ("current table") stores current operational data. The current table is associated with a corresponding history table that contains the historical data. Both the current table and the corresponding history table have identical column structure. Among the columns of the current table and its history table are three columns populated by the DBMS 112 in order to track the transaction time and control temporal transactions:

Begin column. The begin column value represents the time when the data in the row became current. The DBMS 112 generates a value for the begin column by reading a system clock at the moment it executes the first data change statement in the transaction that generates the row.

End column. The end column value represents the time when the row data is no longer current. For rows in a history table, the value in the end column represents when the row was added to the history table.

Transaction start ID column. The transaction start ID column represents the time when execution started for a transaction that impacts the row. This column is nullable. If this column is defined as not null, then the value is the same as the begin column for physical transactions.

Embodiments of the present invention introduce a global temporal logical transaction time variable, that may be set by a user and that allows for fine grained control of a temporal unit of work. This variable may have a default value of NULL, and if so, conventional system-period data versioning would be performed. Conventionally, with system-period data versioning within a physical transaction scope, the DBMS 112 obtains a new timestamp at transaction start for the begin column in the current table and after transaction commit for the end column in the history table. When the global temporal logical transaction time variable is non-NULL, a temporal logical transaction scope is in effect, and the DBMS 112 will instead support system-period data versioning as described below. An application is responsible for setting the values of the global temporal logical transaction time variable to control the scope of the temporal logical transaction. This value will be used to assign begin and end column values of the current and history tables. In the illustrated embodiments, the global temporal logical transaction time variable has no impact on the transaction start ID column. When multiple rows are inserted or updated within a single SQL transaction, the values for the transaction start ID column are the same for all of the rows and are unique from the values generated for this column by other transactions. This common value allows the transaction start ID columns in the current and history tables to be used to identify all rows in the tables that were written by the same physical transaction, regardless of how the temporal logical transactions are defined.

Figure 2:
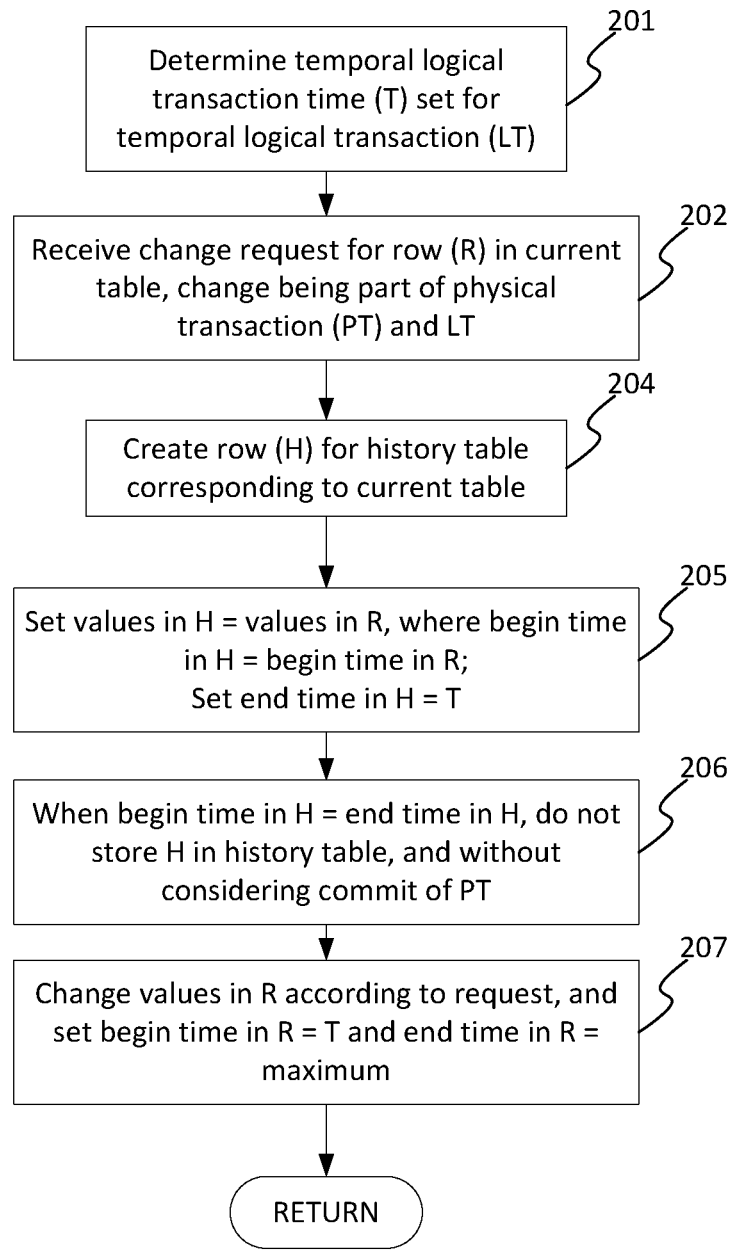
FIG. 2 illustrates a method for temporal logical transaction support according to embodiments of the present invention.

FIG. 2 illustrates a method for temporal logical transaction support according to embodiments of the present invention. When the DBMS 112 determines that the global temporal logical transaction time (T) is set (e.g. has non-null value) (201), this indicates to the DBMS 112 that a temporal logical transaction (LT) is in effect. When the DBMS 112 receives a change request for a row (R) in the current table (202), the DBMS 112 creates a row (H) for the history table corresponding to the current table (204). When T is set, the change request is part of both a physical transaction (PT) and the LT. The DBMS 112 sets the values in H to the values in R, where the begin time in H (stored in the begin column in the history table) has the same value as the begin time in R (stored in the begin column in the current table) (205). The end time in H (stored in the end column in the history table) is set to T (205). When the begin time in H is equal to the end time in H, this indicates to the DBMS 112 that the row was previously changed within the same LT. In response to determining that these times are equal, the DBMS 112 does not store H in the history table (206). The DBMS 112 does not consider the commit of the PT. The DBMS 112 then executes the request and changes the values in R accordingly, sets the begin time in R to T, and sets the end time in R to 'maximum' or some other value indicating that the row is current (207). When T is not set (e.g. has a null value), the system time is used in the system-period data versioning, and the end of a transaction is based on the commit of the physical transaction.

A database is a highly concurrent system, and thus there is a chance of conflicts whenever table data is updated. In the illustrative embodiments, the present invention ensures data integrity by blocking any data change operations that will cause a history row to have a begin time value greater than the end time value. Further, during the execution of data change operations on a system-period temporal table, the DBMS 112 will not store a history row in the history table if the begin time value is equal to the end time value. This is to ensure that the intermediate changes within the same temporal logical transaction are not captured in the history table.

Figure 3:
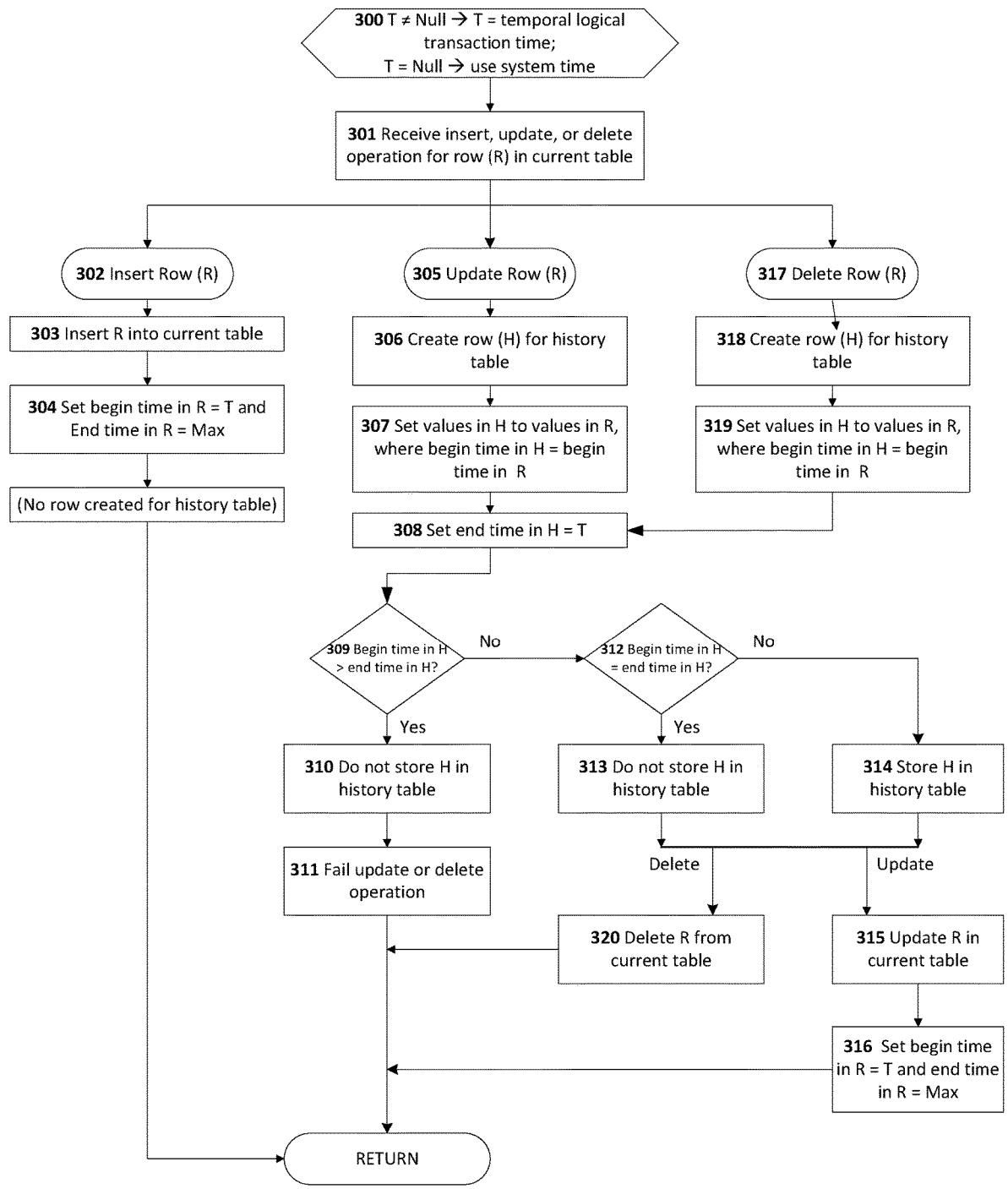
FIG. 3 illustrates in more detail the method for temporal logical transaction support according to embodiments of the present invention.

FIG. 3 illustrates in more detail the method for temporal logical transaction support according to embodiments of the present invention. When the DBMS system 112 determines that the global temporal logical transaction time (T) has a non-null value (300), this indicates to the DBMS 112 that a temporal logical transaction (LT) is in effect. The DBMS 112 receives an insert, update, or delete operation for a row (R) in a current table (301). When the operation is to insert R (302), the DBMS 112 inserts R into the current table (303). The DBMS 112 also sets the begin time in R to T and the end time in R to 'maximum' (304). No row is created for the history table.

When the operation is an update of R in the current table (305), the DBMS 112 creates a row (H) of the history table corresponding to the current table (306). The values in H are set to values in R, where the begin time in H has the same value as the begin time in R (307). The end time in H is set to T (308). The DBMS then checks for conflicts by comparing the begin time in H with the end time in H (309). When the begin time in H is greater than the end time in H, this indicates an update conflict, and the DBMS 112 responds by not storing H in the history table (310) and by failing the update operation (311). When the begin time in H is not greater than the end time in H, the DBMS 112 further checks if the begin time in H is equal to the end time in H (312). When the begin time and the end time in H are the same, this indicates that the update is an intermediate change on R within the LT, and the DBMS 112 responds by not storing H in the history table (313). Otherwise, the DBMS 112 stores H in the history table (314). R is then updated in the current table (315), the begin time in R is set to T, and the end time in R is set to 'maximum' (316).

When the operation is to delete R from the current table (317), the DBMS 112 creates a row (H) of the history table corresponding to the current table (318). The values in H are set to the values in R (319), where the begin time in H has the same value as the begin time in R. The end time in H is set to T (308). The DBMS 112 then checks for conflicts by comparing the begin time in H with the end time in H (309). When the begin time in H is greater than the end time in H, this indicates a delete conflict, and the DBMS 112 responds by not storing H in the history table (310) and failing the delete operation (311). When the begin time in H is not greater than the end time in H, the DBMS 112 further checks if the begin time in H is equal to the end time in H (312). When the begin time and the end time in H are equal, this indicates that the delete is an intermediate change on R within the LT, and the DBMS 112 responds by not storing H in the history table (313). Otherwise, the DBMS 112 stores H in the history table (314). R is then deleted from the current table (320).

FIGS. 4A-4H illustrate examples of the method for temporal logical transaction support according to embodiments of the present invention. FIG. 4A illustrates the initial data for the following examples. Assume that the temporal logical transaction time (T) is set to null, and the DBMS 112 receives an insert operation 401 to insert the illustrated values into the policy table, which is enabled for system-period data versioning. The policy table contains columns p_id, type, and copay. The policy table further contains system-period data versioning columns sys_start (begin column), sys_end (end column), and trans_id (transaction start ID column). Assume also that the policy table has a corresponding history table named policy_hist, and the start time of the insert transaction 401 is '2013-11-25-11.15.00'. Based on the insert transaction 401, row 402 is inserted into the policy table, and no row is created for the policy_hist table. The trans_id column=the sys_start column.

FIG. 4B illustrates a first example of the method for temporal logical transaction support according to embodiments of the present invention. In this first example, a single temporal logical transaction (LT) contains multiple physical transactions (PT1 and PT2). Referring to FIGS. 3 and 4B, and using the table data in FIG. 4A as the initial data, LT is started by the SET statement 404. Assume that the SET statement 404 sets T='2013-12-02-08.17.33' (300). At system time='2013-12-02-08.20.45', the first physical transaction (PT1) starts. The DBMS 112 receives the update statement 405 to update row 402 in the policy table (301). Statement 405 is part of both PT1 and LT. In response, the DBMS 112 creates history row 409 (306). The column values of history row 409 are set to the column values in row 402 (307). The sys_start in history row 409 is set to '2013-11-25-11.15.00', and the sys_end in history row 409 is set to '2013-12-02-08.17.33' (308). The DBMS 112 then checks for conflicts by comparing sys_start and sys_end in history row 409 (309). Since '2013-11-25-11.15.00' is not greater than '2013-12-02-08.17.33', there is no conflict. The DBMS 112 then determines that sys_start does not equal sys_end in history row 409 (312). In response, the DBMS 112 stores history row 409 into the policy_hist table (314). The DBMS 112 updates row 402 in the policy table, resulting in row 407 (315). The DMBS 112 also sets sys_start='2013-12-02-08.17.33' and sys_end='9999-12-30-00.00.00' in row 407 (316). Since the setting of the trans_id column does not change with the present invention, this column is set to '2013-12-02-08.20.45' for PT1.

At system time='2013-12-02-08.25.48', the second physical transaction (PT2) starts. The DBMS 112 receives the update statement 406 (301). Statement 406 is part of both PT2 and LT. In response, the DBMS 112 creates a history row 410 (306). The column values in history row 410 are set to the column values in row 407 (307). The sys_start in history row 410 is set to '2013-12-02-08.17.33', and the sys_end in history row 410 is set to '2013-12-02-08.17.33' (308). The DBMS 112 then checks for conflicts by comparing sys_start and sys_end in history row 410 (309). Since '2013-12-02-08.17.33' is not greater than '2013-12-02-08.17.33', there is no conflict. The DBMS 112 then determines that sys_start=sys_end in history row 410 (312). In response, the DBMS 112 does not store history row 410 into the policy_hist table (313). The DBMS 112 updates row 407 in the policy table, resulting in row 408 (315). The DBMS 112 also sets sys_start='2013-12-02-08.17.33' and sys_end='9999-12-30-00.00.00' in row 408 (316). The trans_id column is set to '2013-12-02-08.25.48' for PT2.

FIG. 4C illustrates a second example of the method for temporal logical transaction support according to embodiments of the present invention. In this second example, a single physical transaction (PT) contains multiple temporal logical transactions (LT1 and LT2). Referring to FIGS. 3 and 4C, and using the table data in FIG. 4A as the initial data, PT starts at system time='2013-12-02-08.15.45'. LT1 is started by the SET statement 421. Assume that the SET statement 421 sets T='2013-12-02-08.17.33' (300). The DBMS 112 receives the update statement 422 to update row 402 in the policy table (301). Statement 422 is part of both PT and LT1. In response, the DBMS 112 creates history row 427 (306). The column values of history row 427 are set to the column values in row 402 (307). The sys_start in history row 427 is set to '2013-11-25-11.15.00', and the sys_end in history row 427 is set to '2013-12-02-08.17.33' (308). The DBMS 112 then checks for conflicts by comparing sys_start and sys_end in history row 427 (309). Since '2013-11-25-11.15.00' is not greater than '2013-12-02-08.17.33', there is no conflict. The DBMS 112 then determines that sys_start does not equal sys_end in history row 427 (312). In response, the DBMS 112 stores history row 427 into the policy_hist table (314). The DBMS 112 updates row 402 in the policy table, resulting in row 425 (315). The DMBS 112 also sets sys_start='2013-12-02-08.17.33' and sys_end='9999-12-30-00.00.00' in row 425 (316). The trans_id column is set to '2013-12-02-08.15.45' for PT.

LT2 is started by the SET statement 423. Assume that the SET statement 423 sets T='2013-12-02-08.20.10'. The DBMS 112 receives the update statement 424 (301). Statement 424 is part of both PT and LT2. In response, the DBMS 112 creates a history row 428 (306). The column values in history row 428 are set to the column values in row 425 (307). The sys_start in history row 428 is set to '2013-12-02-08.17.33', and the sys_end in history row 428 is set to '2013-12-02-08.20.10' (308). The DBMS 112 then checks for conflicts by comparing sys_start and sys_end in history row 428 (309). Since '2013-12-02-08.17.33' is not greater than '2013-12-02-08.20.10', there is no conflict. The DBMS 112 then determines that sys_start does not equal sys_end in history row 428 (312). In response, the DBMS 112 stores history row 428 into the policy_hist table (314). The DBMS 112 updates row 425 in the policy table, resulting in row 426 (315). The DBMS 112 also sets sys_start='2013-12-02-08.20.10' and sys_end='9999-12-30-00.00.00' in row 426 (316). The trans_id column remains '2013-12-02-08.15.45' for PT.

FIG. 4D illustrates a third example of the method for temporal logical transaction support according to embodiments of the present invention. In this third example, a single physical transaction (PT) contains multiple temporal logical transactions (LT1 and LT2). Referring to FIGS. 3 and 4C, and using the table data in FIG. 4A as the initial data, PT starts at system time='2013-12-02-08.15.45'. LT1 is started by the SET statement 431. Assume that the SET statement 431 sets T='2013-12-02-08.17.33' (300). The DBMS 112 receives the update statement 432 to update row 402 in the policy table (301). Statement 432 is part of both PT and LT1.

In response, the DBMS 112 creates history row 436 (306). The column values of history row 436 are set to the column values in row 402 (307). The sys_start in history row 436 is set to '2013-11-25-11.15.00', and the sys_end in history row 436 is set to '2013-12-02-08.17.33' (308). The DBMS 112 then checks for conflicts by comparing sys_start and sys_end in history row 436 (309). Since '2013-11-25-11.15.00' is not greater than '2013-12-02-08.17.33', there is no conflict. The DBMS 112 then determines that sys_start does not equal sys_end in history row 436 (312). In response, the DBMS 112 stores history row 436 into the policy_hist table (314). The DBMS 112 updates row 402, resulting in row 435 (315). The DMBS 112 also sets sys_start='2013-12-02-08.17.33' and sys_end='9999-12-30-00.00.00' in row 435 (316). The trans_id column set to '2013-12-02-08.15.45' for PT.

LT2 is started by the SET statement 433, which sets T='2013-12-02-00.00.00'. The DBMS 112 receives the update statement 434 (301). Statement 434 is part of both PT and LT2. In response, the DBMS 112 creates a history row 437 (306). The column values in history row 437 are set to the column values in row 435 (307). The sys_start in history row 437 is set to '2013-12-02-08.17.33', and the sys_end in history row 437 is set to '2013-12-02-00.00.00' (308). The DBMS 112 then checks for conflicts by comparing sys_start and sys_end in history row 437 (309). Since '2013-12-02-08.17.33' is greater than '2013-12-02-00.00.00', there is a conflict. In response, the DBMS 112 does not store history row 437 into the policy_hist table (310). The DBMS 112 fails the update operation 434, or performs a rollback of the update operation 434 (311).

FIG. 4E illustrates a fourth example of the method for temporal logical transaction support according to embodiments of the present invention. In this fourth example, concurrent applications, each with a physical transaction (PT1 and PT2) interact with multiple concurrent temporal logical transactions (LT1 and LT2). Referring to FIGS. 3 and 4E, and using the table data in FIG. 4A as the initial data, PT1 starts at system time='2013-12-02-08.15.45', and PT2 starts at system time='2013-12-02-08.17.55'. PT1 thus obtains a data lock before PT2. PT1 contains LT1, which is started by the SET statement 441. Assume that the SET statement 441 sets T='2013-12-02-08.17.33' (300). The DBMS 112 receives the update statement 442 to update row 402 in the policy table (301). Statement 442 is part of both PT1 and LT1. In response, the DBMS 112 creates history row 447 (306). The column values of history row 447 are set to the column values in row 402 (307). The sys_start in history row 447 is set to '2013-11-25-11.15.00', and the sys_end in history row 447 is set to '2013-12-02-08.17.33' (308). The DBMS 112 then checks for conflicts by comparing sys_start and sys_end in history row 447 (309). Since '2013-11-25-11.15.00' is not greater than '2013-12-02-08.17.33', there is no conflict. The DBMS 112 then determines that sys_start does not equal sys_end in history row 447 (312). In response, the DBMS 112 stores history row 447 into the policy_hist table (314). The DBMS 112 updates row 402 in the policy table, resulting in row 445 (315). The DMBS 112 also sets sys_start='2013-12-02-08.17.33' and sys_end='9999-12-30-00.00.00' in row 445 (316). The trans_id column is set to '2013-12-02-08.15.45' for PT1. PT1 then release the data lock.

PT2 then obtains the data lock. PT2 contains LT2, which is started by the SET statement 443. The SET statement 443 sets T='2013-12-02-08.20.10'. The DBMS 112 receives the update statement 444 (301). Statement 444 is part of both PT2 and LT2. In response, the DBMS 112 creates a history row 448 (306). The column values in history row 448 are set to the column values in row 445 (307). The sys_start in history row 448 is set to '2013-12-02-08.17.33', and the sys_end in history row 448 is set to '2013-12-02-08.20.10' (308). The DBMS 112 then checks for conflicts by comparing sys_start and sys_end in history row 448 (309). Since '2013-12-02-08.17.33' is not greater than '2013-12-02-08.20.10', there is no conflict. The DBMS 112 then determines that sys_start does not equal sys_end in history row 448 (312). In response, the DBMS 112 stores history row 448 into the policy_hist table (314). The DBMS 112 updates row 445 in the policy table, resulting in row 446 (315). The DBMS 112 also sets sys_start='2013-12-02-08.20.10' and sys_end='9999-12-30-00.00.00' in row 446 (316). The trans_id column is set to '2013-12-02-08.17.55' for PT2.

FIG. 4F illustrates a fifth example of the method for temporal logical transaction support according to embodiments of the present invention. In this fifth example, concurrent applications, each with a physical transaction (PT1 and PT2) interact with multiple concurrent temporal logical transactions (LT1 and LT2). Referring to FIGS. 3 and 4F, and using the table data in FIG. 4A as the initial data, PT1 starts at system time='2013-12-02-08.15.45', and PT2 starts at system time='2013-12-02-08.17.33'. PT1 thus obtains a data lock before PT2. PT1 contains LT1, which is started by the SET statement 451. Assume that the SET statement 451 sets T='2013-12-02-08.17.33' (300). The DBMS 112 receives the update statement 452 to update row 402 in the policy table (301). Statement 452 is part of both PT1 and LT1. In response, the DBMS 112 creates history row 456 (306). The column values of history row 456 are set to the column values in row 402 (307). The sys_start in history row 456 is set to '2013-11-25-11.15.00', and the sys_end in history row 456 is set to '2013-12-02-08.17.33' (308). The DBMS 112 then checks for conflicts by comparing sys_start and sys_end in history row 456 (309). Since '2013-11-25-11.15.00' is not greater than '2013-12-02-08.17.33', there is no conflict. The DBMS 112 then determines that sys_start does not equal sys_end in history row 456 (312). In response, the DBMS 112 stores history row 456 into the policy_hist table (314). The DBMS 112 updates row 402 in the policy table, resulting in row 455 (315). The DMBS 112 also sets sys_start='2013-12-02-08.17.33' and sys_end='9999-12-30-00.00.00' in row 455 (316). The trans_id column is set to '2013-12-02-08.15.45' for PT1. PT1 then releases the data lock.

PT2 then obtains the data lock. PT2 contains LT2, which is started by the SET statement 453. The SET statement 453 sets T='2013-12-02-00.00.00'. The DBMS 112 receives the update statement 454 (301). Statement 454 is part of both PT2 and LT2. In response, the DBMS 112 creates a history row 457 (306). The column values in history row 457 are set to the column values in row 455 (307). The sys_start in history row 457 is set to '2013-12-02-08.17.33', and the sys_end in history row 457 is set to '2013-12-02-00.00.00' (308). The DBMS 112 then checks for conflicts by comparing sys_start and sys_end in history row 457 (309). Since '2013-12-02-08.17.33' is greater than '2013-12-02-08.00.00', there is a conflict. In response, the DBMS 112 does not store history row 457 into the policy_hist table (310). The DBMS 112 fails the update operation 454, or performs a rollback of the update operation 454 (311).

FIG. 4G illustrates a sixth example of the method for temporal logical transaction support according to embodiments of the present invention. In this sixth example, concurrent applications, each with a physical transaction (PT1 and PT2), interact with a temporal logical transaction (LT) concurrent with PT2. Referring to FIGS. 3 and 4G, and using the table data in FIG. 4A as the initial data, PT1 starts at system time='2013-12-02-08.15.45', and PT2 starts at system time='2013-12-02-08.16.33'. PT1 thus obtains a data lock before PT2. PT1 contains LT, which is started by the SET statement 461. Assume that the SET statement 461 sets T='2013-12-02-08.17.33' (300). The DBMS 112 receives the update statement 462 to update row 402 in the policy table (301). Statement 462 is part of both PT1 and LT. In response, the DBMS 112 creates history row 465 (306). The column values of history row 465 are set to the column values in row 402 (307). The sys_start in history row 465 is set to '2013-11-25-11.15.00', and the sys_end in history row 465 is set to '2013-12-02-08.17.33' (308). The DBMS 112 then checks for conflicts by comparing sys_start and sys_end in history row 465 (309). Since '2013-11-25-11.15.00' is not greater than '2013-12-02-08.17.33', there is no conflict. The DBMS 112 then determines that sys_start does not equal sys_end in history row 465 (312). In response, the DBMS 112 stores history row 465 into the policy_hist table (314). The DBMS 112 updates row 402 in the policy table, resulting in row 464 (315). The DMBS 112 also sets sys_start='2013-12-02-08.17.33' and sys_end='9999-12-30-00.00.00' in row 464 (316). The trans_id column is set to '2013-12-02-08.15.45' for PT1. PT1 then releases the data lock.

PT2 then obtains the data lock. PT2 does not contain a temporal logical transaction, thus the system time of '2013-12-02-08.16.33' is used. The DBMS 112 receives the update statement 463 (301). In response, the DBMS 112 creates a history row 466 (306). The column values in history row 466 are set to the column values in row 464 (307). The sys_start in history row 466 is set to '2013-12-02-08.17.33', and the sys_end in history row 466 is set to '2013-12-02-08.16.33' (308). The DBMS 112 then checks for conflicts by comparing sys_start and sys_end in history row 466 (309). Since '2013-12-02-08.17.33' is greater than '2013-12-02-08.16.33', there is a conflict. In response, the DBMS 112 does not store history row 466 into the policy_hist table (310). The DBMS 112 fails the update operation 463, or performs a rollback of the update operation 463 (311).

FIG. 4H illustrates a seventh example of the method for temporal logical transaction support according to embodiments of the present invention. In this seventh example, concurrent applications, each with a physical transaction (PT1 and PT2), interact with a temporal logical transaction (LT) concurrent with PT2. Referring to FIGS. 3 and 4H, and using the table data in FIG. 4A as the initial data, PT1 starts at system time='2013-12-02-08.15.45', and PT2 starts at system time='2013-12-02-08.15.33'. PT2 thus obtains a data lock before PT1. PT2 does not contain a temporal logical transaction, thus the system time of '2013-12-02-08.15.33' is used. The DBMS 112 receives the update statement 473 (301). In response, the DBMS 112 creates a history row 475 (306). The column values in history row 475 are set to the column values in row 402 (307). The sys_start in history row 475 is set to '2013-11-25-11.15.00', and the sys_end in history row 475 is set to '2013-12-02-08.15.33' (308). The DBMS 112 then checks for conflicts by comparing sys_start and sys_end in history row 475 (309). Since '2013-11-25-11.15.00' is not greater than '2013-12-02-08.15.33', there is no conflict. The DBMS 112 then determines that sys_start does not equal sys_end in history row 475 (312). In response, the DBMS 112 stores history row 475 into the policy_hist table (314). The DBMS 112 updates row 402 in the policy table, resulting in row 474 (315). The DMBS 112 also sets sys_start='2013-12-02-08.15.33' and sys_end='9999-12-30-00.00.00' in row 474 (316). The trans_id column is set to '2013-12-02-08.15.33' for PT2. PT2 then releases the data lock.

PT1 then obtains the data lock. PT1 contains LT, which is started by the SET statement 471. Assume that the SET statement 471 sets T='2013-12-02-08.00.00' (300). The DBMS 112 receives the update statement 472 to update row 474 in the policy table (301). Statement 472 is part of both PT1 and LT. In response, the DBMS 112 creates history row 476 (306). The column values of history row 476 are set to the column values in row 474 (307). The sys_start in history row 476 is set to '2013-12-02-08.15.33', and the sys_end in history row 476 is set to '2013-12-02-08.00.00' (308). The DBMS 112 then checks for conflicts by comparing sys_start and sys_end in history row 476 (309). Since '2013-12-02-08.15.33' is greater than '2013-12-02-08.00.00', there is a conflict. In response, the DBMS 112 does not store history row 476 into the policy_hist table (310). The DBMS 112 fails the update operation 472, or performs a rollback of the update operation 472 (311).

In the illustrative embodiments, the temporal logical transaction time is a global variable, which provides a way to consolidate system-period temporal tables from multiple database subsystems. Temporal logical transaction times can be generated by an upstream system and consistently used across multiple or a subset of database transactions. The data collected in the history table would allow the determination of what data changes were made by which business request at a given point in time.

In the illustrative embodiments, the global temporal logical transaction time variable may be applicable with or without a time zone. The DBMS may manage the conversion between a time with time zone values and without time zone values.

The relationship between the physical transaction and the temporal logical transactions is determined by an application. There may or may not be a direct correlation between temporal logical transactions and the physical transaction, which are determined by commit and rollback. In the illustrative embodiments, multiple physical transactions are allowed within a single temporal logical transaction. However, an application is required to take an explicit action to allow multiple temporal logical transactions within a physical transaction. Embodiments of the present invention may further introduce another global system temporal logical transaction variable to allow users to take such explicit action. For example, setting this variable to a first value may disallow multiple temporal logical transaction scopes within a single physical transaction scope, while setting this variable to a second value may allow multiple temporal logical transaction scopes within a single physical transaction scope.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for temporal logical transaction support for temporal data management by a database management system, the computer program product comprising a computer readable storage medium having program instructions embodied therewith, the program instructions executable by a processor to cause the processor to:

determine that a global temporal logical transaction time (T) is set and committed for initiating a temporal logical transaction, wherein T is a logical begin time of the temporal logical transaction, wherein T remains constant during the temporal logical transaction, wherein the temporal logical transaction comprises a logical group of units of temporal work for system-period temporal tables across a plurality of physical transactions, wherein the plurality of physical transactions comprises at least a first physical transaction and a second physical transaction, wherein T defines a time period for the temporal logical transaction, and wherein T is not a system time;

receive a first change request for a current row in a current table, the first change request being a part of the first physical transaction within the temporal logical transaction;

create a first history row for a history table corresponding to the current table, wherein each of the history table and the current table comprises a begin time column and an end time column;

prior to performing the first change request, set values in the first history row to first current values in the current row, wherein a first begin time in the begin time column of the first history row is set to a same begin time in the begin time column of the current row, and wherein a first end time in the end time column of the first history row is set to T;

perform the first change request on the current row and commit the first physical transaction, and wherein the begin time in the begin time column of the current row is set to T;

receive a second change request for the current row in the current table to be performed after the first physical transaction commits, the second change request being a part of the second physical transaction within the temporal logical transaction;

create a second history row for the history table corresponding to the current table;

prior to performing the second change request, set values in the second history row to second current values in the current row, wherein a second begin time in the begin time column of the second history row is set to the begin time in the begin time column of the current row, wherein a second end time in the end time column of the second history row is set to T, and wherein the first end time of the first history row and the second end time of the second history row are both set to T because both the first physical transaction and the second physical transaction are of the same temporal logical transaction;

compare the second begin time and the second end time in the second history row;

upon determining that the second begin time in the second history row is greater than the second end time in the second history row, determine that there is a conflict between the first change request and the second change request for the current row, wherein in response:
        not store the second history row in the history table; and
        fail the second change request; and upon determining that the second begin time in the second history row is equal to the second end time in the second history row, determine that the current row was previously changed by the first physical transaction within the temporal logical transaction, wherein the second begin time in the second history row being equal to the second end time in the second history row indicates that the second physical transaction is an intermediate transaction that is not to be stored in the history table, wherein in response:
        not store the second history row in the history table; and
        perform the second change request on the current row and commit the second physical transaction, wherein the begin time in the begin time column of the current row is set to T.

2. The computer program product of claim 1, wherein the current table is enabled for the temporal data management, wherein the determining that T is set for the temporal logical transaction comprises:
    upon determining that T is set for the temporal logical transaction, use T for the temporal data management; and
    upon determining that T is not set for any temporal logical transaction, use the system time for the temporal data management.

3. The computer program product of claim 1, wherein each of the history table and the current table comprises a transaction identifier column, and wherein, in association with performing the first change request on the current row, set a first transaction identifier in the transaction identifier column of the current row an actual begin time of the first physical transaction.

4. The computer program product of claim 3, wherein the second change request is a delete request, wherein in response to determining that the second begin time in the second history row is not greater than the second end time in the second history row and that the second begin time in the second history row is equal to the second end time in the second history row, not store the second history row in the history table and delete the current row from the current table.

5. The computer program product of claim 3, wherein the second change request is an update request, wherein in response to determining that the second begin time in the second history row is not greater than the second end time in the second history row and that the second begin time in the second history row is not equal to the second end time in the second history row, further:
    not store the second history row in the history table;
    update the values in the current row according to the second change request;
    set the begin time in the current row to T; and
    set an end time in the current row to a value indicating that the current row contains current values.

6. A database management system with temporal logical transaction support for temporal data management, comprising:
    a processor; and
    a computer readable storage medium having program instructions embodied therewith, the program instructions executable by a processor to cause the processor to:
        determine that a global temporal logical transaction time (T) is set and committed for initiating a temporal logical transaction, wherein T is a logical begin time of the temporal logical transaction, wherein T remains constant during the temporal logical transaction, wherein the temporal logical transaction comprises a logical group of units of temporal work for system-period temporal tables across a plurality of physical transactions, wherein the plurality of physical transactions comprises at least a first physical transaction and a second physical transaction, wherein T defines a time period for the temporal logical transaction, and wherein T is not a system time;

receive a first change request for a current row in a current table, the first change request being a part of the first physical transaction within the temporal logical transaction;

create a first history row for a history table corresponding to the current table, wherein each of the history table and the current table comprises a begin time column and an end time column;

prior to performing the first change request, set values in the first history row to first current values in the current row, wherein a first begin time in the begin time column of the first history row is set to a same begin time in the begin time column of the current row, and wherein a first end time in the end time column of the first history row is set to T;

perform the first change request on the current row and commit the first physical transaction, and wherein the begin time in the begin time column of the current row is set to T;

receive a second change request for the current row in the current table to be performed after the first physical transaction commits, the second change request being a part of the second physical transaction within the temporal logical transaction;

create a second history row for the history table corresponding to the current table;

prior to performing the second change request, set values in the second history row to second current values in the current row, wherein a second begin time in the begin time column of the second history row is set to the begin time in the begin time column of the current row, wherein a second end time in the end time column of the second history row is set to T, and wherein the first end time of the first history row and the second end time of the second history row both being set to T indicates that both the first physical transaction and the second physical transaction are of the same temporal logical transaction;

compare the second begin time and the second end time in the second history row;

upon determining that the second begin time in the second history row is greater than the second end time in the second history row, determine that there is a conflict between the first change request and the second change request for the current row, wherein in response:
not store the second history row in the history table; and
fail the second change request; and upon determining that the second begin time in the second history row is equal to the second end time in the second history row, determine that the current row was previously changed by the first physical transaction within the temporal logical transaction, wherein the second begin time in the second history row being equal to the second end time in the second history row indicates that the second physical transaction is an intermediate transaction that is not to be stored in the history table, wherein in response:
not store the second history row in the history table; and
perform the second change request on the current row and commit the second physical transaction, wherein the begin time in the begin time column of the current row is set to T.

7. The system of claim 6, further comprising:
upon determining that the second begin time in the second history row is not greater than the second end time in the second history row and that the second begin time in the history row is not equal to the second end time in the second history row, determine that there is no conflict and store the second history row in the history table.

8. The system of claim 7, wherein the second change request is a delete request, wherein in response to determining that the second begin time in the history row is not greater than the second end time in the second history row and that the second begin time in the second history row is equal to the second end time in the second history row, not store the second history row in the history table and delete the current row from the current table.

9. The system of claim 7, wherein the second change request is an update request, wherein in response to determining that the second begin time in the second history row is not greater than the second end time in the second history row and that the second begin time in the second history row is not equal to the second end time in the second history row, further:
not store the second history row in the history table;
update the values in the current row according to the second change request;
set the begin time in the current row to T; and
set an end time in the current row to a value indicating that the current row contains current values.

* * * * *